US008863806B2

(12) United States Patent
Koolhaas

(10) Patent No.: US 8,863,806 B2

(45) Date of Patent: Oct. 21, 2014

(54) LABELLING PLANT AND METHOD FOR FIXING SLEEVES AROUND CONTAINERS

(71) Applicant: Fuji Seal Europe B.V., Deurne (NL)

(72) Inventor: Ernst Christiaan Koolhaas, Nuenen (NL)

(73) Assignee: Fuji Seal International, Inc., Osaka (JP)

(*) Notice: Subject to any disclaimer, the term of this patent is extended or adjusted under 35 U.S.C. 154(b) by 0 days.

(21) Appl. No.: 13/869,585

(22) Filed: Apr. 24, 2013

(65) Prior Publication Data

US 2013/0284346 A1 Oct. 31, 2013

(30) Foreign Application Priority Data

Apr. 26, 2012 (NL) .................................... 2008718

(51) Int. Cl.

*B29C 31/00* (2006.01)
*B65C 9/06* (2006.01)
*B65C 3/00* (2006.01)
*B65C 3/06* (2006.01)

(52) U.S. Cl.

CPC ... *B65C 9/06* (2013.01); *B65C 3/00* (2013.01); *B65C 3/065* (2013.01)

USPC ........................... 156/566; 156/556; 156/540

(58) Field of Classification Search

CPC .......... B65B 9/13; B65B 53/02; B65D 85/00; B65C 3/00; B65C 9/26

USPC ........................................ 156/566, 556, 540

See application file for complete search history.

(56) References Cited

U.S. PATENT DOCUMENTS

| | | | | |
|---|---|---|---|---|
| 3,523,052 | A | 8/1970 | Bolen | |
| 5,024,049 | A | 6/1991 | Strub et al. | |
| 2005/0072510 | A1 * | 4/2005 | Navarro et al. | 156/64 |

FOREIGN PATENT DOCUMENTS

| | | | |
|---|---|---|---|
| EP | 1 016 595 | A1 | 7/2000 |
| EP | 1 587 736 | B1 | 10/2006 |
| EP | 2 412 635 | A1 | 2/2012 |
| WO | WO 2004/067385 | A1 | 8/2004 |
| WO | WO 2011/031160 | A1 | 3/2011 |

OTHER PUBLICATIONS

Search Report issued in Dutch Application No. 2008718 dated Feb. 6, 2013 (with translation).

Written Opinion issued in Dutch Application No. 2008718 dated Feb. 6, 2013.

* cited by examiner

*Primary Examiner* — Jeff Aftergut
*Assistant Examiner* — Jaeyun Lee
(74) *Attorney, Agent, or Firm* — Oliff PLC

(57) ABSTRACT

The invention relates to a labelling plant and method for containers. Heat shrinkable sleeves are supplied and containers are supplied. A device for arranging the sleeve around the container will arrange the sleeve in a position with respect to the container. In a heat shrink oven the sleeves are fixed to the container forming the label. A conveyor will transport containers from the container supply and sleeves from the sleeve supply into the heat shrink oven. According to the invention a sleeve support will hold one or more sleeves in a predetermined position with respect to the container. The sleeve support comprises a platform supporting a part of a circumferential edge of the sleeve. Further one or at least two sleeve support elements are arranged to abut on an external side of the sleeve and to support the sleeve in an opened state.

13 Claims, 12 Drawing Sheets

LABELLING PLANT AND METHOD FOR FIXING SLEEVES AROUND CONTAINERS

Figure 1:
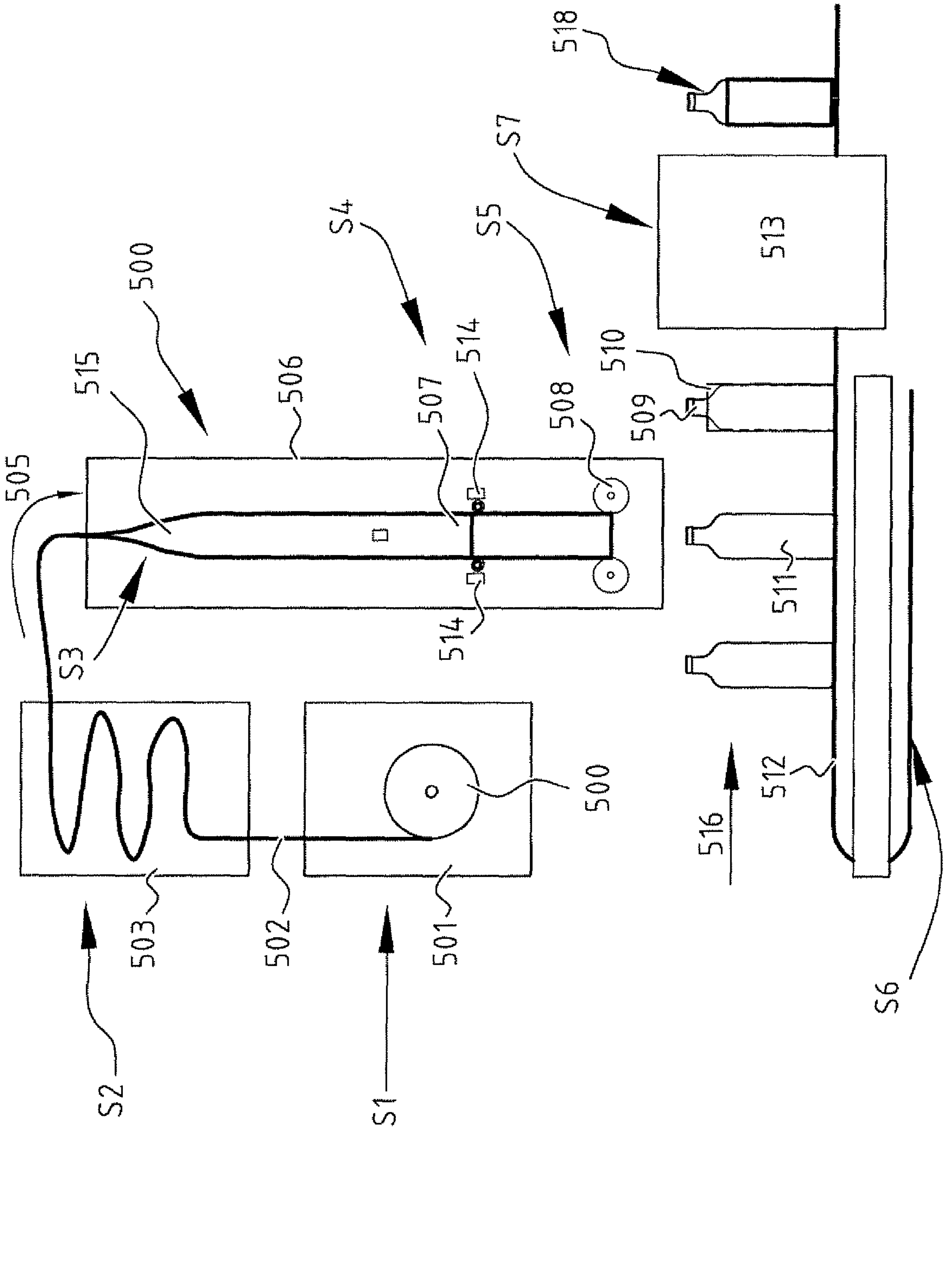

The invention concerns a labelling plant for fixing sleeves around containers. The invention also concerns a method for fixing the sleeves around the container. The invention also relates to a supporting element for supporting a sleeve in a predetermined position with respect to the container.

It is known to arrange sleeves around containers and to use auxiliary supporting elements for holding the sleeve in a position with respect to the container.

Without the auxiliary supporting elements the sleeve would be positioned e.g. directly on the conveyor surface. The supporting element can also be used to position sleeves in a pattern, e.g. 2×2 or 2×3, that can be used to label a thermoformed product having several containers in such a pattern. These sleeves can be transferred in a single operation for multiple support elements onto multiple containers of the same product.

From EP 1 587 736 A1 it is known to arrange sleeves around containers having a rim by prearranging several sleeves in an open position. Retractable pins are used for holding the sleeve in an upright position. A container suspended on cables can be positioned in the opened sleeve. Subsequently the sleeve is fixed to the container using heat. This method is not suited for high speed labelling.

EP 1 016 595 discloses preformed conical sleeves. The sleeves are formed having a permanent opened position. A container is positioned in the sleeves.

With respect to the prior art systems it is a problem to increase the speed. When the speed is increased and/or the foil thickness is reduced, the reliability of the prior art devices and methods will decrease.

It is therefore a goal in accordance with an aspect of the invention to provide a more reliable labelling plant. A further goal could be to reduce the complexity of such a labelling device in accordance with a first aspect.

A labelling plant is provided for fixing the sleeves to containers comprising a sleeve supply for supplying sleeves. Preferably sleeves of heat shrinkable foil are supplied. Preferably tubular sleeves are supplied. The heat shrinkable sleeves can comprise printed foil and form the labels having for example product information that is to be arranged around the container. The sleeve supply could be connected to a supply of flattened tubular heat shrinkable foil such as a reel with winded foil.

The sleeve supply could comprise an opening unit for opening the tubular foil, a cutting unit for cutting sleeves from the opened tubular foil and an ejection unit for ejecting the sleeve from the sleeve supply. The sleeve supply allows providing individually cut sleeves to be arranged around containers.

In an embodiment the labelling plant provides the container supply. Containers are arranged to hold a portion, such as a drink or a milk product or nuts or candy, and can have a lid for opening the container and allowing access to the content of the container. An embodiment comprises a removable seal for opening the container. The container can have a circumference and can have a circular or elliptical cross section and extend tubularly or conically. The container can also have grips or indentations.

In an embodiment the labelling plant also comprises a device for arranging the sleeve around a container. In an embodiment the device for arranging the sleeve around a container is the ejection unit or container supply.

In an embodiment the labelling plant also comprises a heat shrink oven for fixing the sleeve to the container. The oven for heat shrinking is in an embodiment a steam oven comprising multiple nozzles and several stages for fixing the container.

In an embodiment the labelling plant comprises a conveyor for transporting containers from the container supply and sleeves from the sleeve supply. The conveyor can support one or both. In a device for arranging a sleeve around the container, the sleeve is arranged in its position for fixation around the container.

In an embodiment the sleeve support or carrier is supplied upstream from the device for arranging the sleeve around the container. The sleeve support will receive the sleeve or container in the device for arranging the sleeve around the container and will orientate the container with respect to the sleeve.

The conveyor can also be arranged to convey the sleeve and container into a heat shrink oven for fixing the sleeve to the container. Hot steam in the heat shrink oven will shrink the foil of the sleeve thereby fixing the sleeve to the container forming a label.

In accordance with an embodiment of the invention a sleeve support is provided arranged to provide support to the sleeve for holding the sleeve in a predetermined position with respect to the container. This predetermined position is preferably a position or orientation in which the sleeve is to be fixed to the container. Holding the predetermined position can comprise a support for the sleeve to hold that position with respect to the container. Preferably at least two and preferably at three degrees of freedom of the sleeve with respect to the container are locked.

Holding in accordance to the invention can comprise an auxiliary supporting element, auxiliary to the sleeve, container and conveyor. The auxiliary support allows positioning the sleeve in a desired position with respect to the container, e.g. halfway a container. Examples are an opened position, a rotationally locked position, an elevated position of sleeve or container and so on. In an embodiment an intermediate step of gluing the sleeve to the container is applied. The sleeve support allows orienting and positioning the sleeve with respect to the container, e.g. halfway the container or acute. The support can be an auxiliary device to help positioning the sleeve with respect to the container.

In an embodiment the sleeve support comprises a platform arranged for supporting a circumferential edge of the sleeve and at least two sleeve support element arranged to abut on an external side of the sleeve and arranged to support the sleeve in an opened state. The tubular heat shrink sleeve is in an open state when a longitudinal opening extends in the sleeve along the longitudinal axis of the sleeve. The sleeve support elements achieve the opened state obtained by providing the support from outside inward. The sleeve support according to this embodiment will support the sleeve inwardly at at least two positions which result in many parts of the sleeve being unsupported. These parts are held free such that steam can easily reach these portions and perform the necessary shrinking thereof in the heat shrink oven. By abutting on the exterior side the handling of the sleeve is simplified and complex actuators are superfluous.

Arranging the container can comprise feeding the container from above downward in the opened sleeve. In another embodiment the opened sleeve with sleeve support is raised with respect to the product container to surround the container.

In a further embodiment the conveyor is arranged to transport the container as well as the sleeve arranged around the container as well as the carrier/sleeve support holding the sleeve in the predetermined position with respect to the container. The conveyor is arranged to transport the container/ sleeve/carrier assembly into the heat shrink oven. This allows performing or at least starting the heat shrinking operation on the heat shrinkable film while the film is held in the predetermined position with respect to the container. This will reduce product loss as the foil is held in its predetermined position directly before starting the heat shrinking, which can improve the heat shrinking results. Although the sleeve is held in the predetermined position, and a reliable support is obtained using the platform and the support elements steam for shrinking the sleeve can still easily reach most parts of the sleeve and reliable shrinking is obtained.

According to an embodiment holding the sleeve in the predetermined position comprises opening the sleeve. In the opened state a container can be received in tubular sleeve. The container can be lowered into the sleeves.

The improved support in accordance to one of the embodiments of the invention results in more container design freedom. Square, round, oval, conical and spoonable effects could be used in combination with this method/device. Further the uptime of the method/device is improved.

In an embodiment the sleeve support comprises an inside support element for supporting the sleeve in an opened position from inside out.

In an embodiment the sleeve support, specifically the inside support element, comprises a dummy element that guides and/or temporarily supports the sleeve in the predetermined position. The dummy element can be spring biased to the support position. The dummy element is arranged such that positioning the container onto the sleeve support will move the dummy element against the spring bias into a chamber, such as in a foot of the sleeve support. The dummy support will hold the sleeve in the predetermined position until the container is arranged inside the sleeve.

The dummy support is preferably used in combination with outside support. The dummy support allows ejecting the sleeve onto the support device, while the support device is moving at a high speed generally perpendicular to the ejection direction. The outward directed support from the dummy supports the transition and acceleration of the sleeve during ejection and into the predetermined position.

In a further embodiment a sleeve support supply is provided. The sleeve support is embodied as a carrier for supporting one or more sleeves in a predetermined position. The sleeve support supply allows supplying sleeve supports or carriers to the conveyor. Each sleeve support can support one or more sleeves in a predetermined position. Each sleeve is held in a predetermined position with respect to each container.

In a further embodiment the labelling plant comprises a sleeve support discharge positioned downstream from the heat oven. This will allow removing the sleeve support from the conveyor after passing the heat oven.

In an embodiment the sleeve support supply is positioned upstream from the sleeve supply and the container supply. By providing a separate sleeve support supply the sleeve supports are carried by the conveyor as separate entities and can be removed from the conveyor, e.g. when it is determined that the sleeve is not, despite effective control according to the invention, held in the desired predetermined position, and the sleeve support can be discharged from the conveyor before entering the heat shrink oven. Further separate sleeve supports allow increasing the pitch between respective container products, irrespective of the properties of the conveyor. Further cleaning of the sleeve support/carrier is possible when they are separated from the conveyor.

A separate sleeve support, supplied from a carrier supply allows easy cleaning and sterilization of machine parts and quick changeovers adapted to a different sized container.

Preferably the columns support the folds of the sleeve. Preferably the opposite sides of the sleeve are supported inwardly thereby providing a force opening the sleeve. By providing support extending over a part of the longitudinal length of the sleeve, the sleeve position is supported and especially during the fixing of the sleeve onto a container having a conically shaped cross section of having a stack rim, this support will decrease the risk of pull-down during shrinking near the stack rim.

In an embodiment the sleeve support also comprises a surface for supporting the container position. This will allow the sleeve support to control the position of both the sleeve and the carrier which will result in a better positioning of the sleeve in the predetermined position with respect to the container. In an embodiment the container position support can comprise a lowered part for receiving part of the bottom of a container. This allows guiding and controlling the position of the container.

In a further embodiment the sleeve support comprises a groove extending along a part of the longitudinal side of the sleeve. The groove is located on the support element on an interior side thereof directed at an exterior side of the sleeve when held in a predetermined position. The groove allows receiving a part of the circumference along a longitudinal side of the sleeve and when such part is received in the groove, the groove will prevent rotational moving of the sleeve. Preferably the groove is formed in both sleeve supports.

In an embodiment the groove is sharp edged, such as V-shaped, which will allow receiving and holding a fold of the sleeve, such as longitudinal folds resulting of the foil being transported in flattened form.

The groove can also form a guiding element for guiding the sleeve towards the predetermined position as in an embodiment the groove is arranged to receive and guide the folds of the sleeve and the controller is arranged to supply the sleeves from the sleeve supply when folds in the sleeves are aligned with the grooves of the sleeve support.

Preferably the sleeve support element comprises a column. The column extends outwardly/upwardly from the platform. In an embodiment the platform is formed by a plate, in other embodiments the platform comprises only a small arm.

In an embodiment the groove in the support element or column ends in a stop forming the platform for supporting a longitudinal edge of the sleeve.

In a preferred embodiment the platform is convex, the middle part being higher than outer part. This will allow water or fluid to flow off the platform. Water collection is prevented.

In an embodiment the supporting element has a height with respect to the platform (extends from the platform) that corresponds with the longitudinal length of the sleeve. When the sleeve is held in its supported predetermined position, accordingly, the sleeve will stand on the platform and the sleeve support element extends along the complete longitudinal length of the sleeve. It is not necessary in accordance with the invention to provide support along the complete longitudinal length. Support can be provided at several separated positions.

When a container having a rim is positioned in the opened sleeve held in the predetermined position, said rim can abut on a top surface of the support element and thereby said top surface will be support surface supporting the rim of the container. In combination with the height of the sleeve corresponding to the height of the support element, now the predetermined position allows positioning the sleeve directly under the rim which will improve the sleeving results.

In a further embodiment the top surface of the support element has a height with respect to the platform that is larger than the length of the container measured downwardly from the rim. When the container having the rim is positioned in the support elements in the opened sleeve, the bottom of the container will not reach the platform and the sleeve will extend beyond the bottom of the container. This will allow under lagging during sleeving wherein a part of the sleeve extending downward from the bottom of the container is fixed to said bottom of the container which in many applications is a desired result.

In a further embodiment the container supply is positioned upstream from the sleeve supply. In this embodiment preferably the sleeve supply and device for arranging the sleeve around the container are the same. First containers are positioned on the conveyor having a sleeve support and thereafter the sleeve is applied to the container and held in its predetermined position.

In an embodiment the sleeve supply is positioned upstream from the container supply, wherein the container supply is the device for arranging the sleeve around the container. The container supply is arranged to supply the container in the opened sleeve held in the predetermined position. The sleeve is already held in the predetermined position followed by positioning the container in the opened sleeve.

Preferably the sleeve supply is connectable to a supply of flattened tubular foil of heat shrink material, e.g. wound around a foil reel, and the sleeve supply comprises an opening unit for opening the tubular foil, e.g. in the form of a mandrel, a cutting unit for cutting the sleeves from the opened tubular foil and an ejection unit for ejecting the sleeve from the sleeve supply.

In an embodiment sleeves are cut from the flattened tubular foil and are rejected and subsequently opened by positioning the sleeve in the predetermined position.

In a further embodiment the container supply is arranged for supplying packaging containers such as cups or the like formed by deep drawing or thermal forming in a clocked manner on a packaging interior strip at least one longitudinal row. In an embodiment the container supply comprises a form fill seal machine for forming cups and bottles. Preferably several adjacent rows are formed. In an embodiment the containers are formed according to a predetermined pattern of e.g. 2×2 or 2×3 containers in a single packaging material strip. Preferably the containers are filled with product. Preferably the containers are sealed. The method and plant according to the invention allow handling of filled containers in an upright position, thereby preventing disturbance of the product held in the container.

In a further embodiment the container forming the receiving surface for the label is conically shaped. Such conical shapes are hard to label as during heat shrinking a label will tend to move towards the conical tip of the product. Using the support according to the invention, the label is held in a predetermined position during heat shrinking. This will prevent the tendency of the label to move from its desired position and will reduce the pull up risk. Also sleeving of the stack rim will be improved.

According to another aspect of the invention a sleeve support is provided having an internal body for supporting an inside of the sleeve in an opened position. The internal body is spring biased. The internal body is arranged to allow positioning a container in the opened sleeve, wherein the internal body is moved against the spring bias. The internal body will support the container, thereby orienting the sleeve with respect to the container.

The internal body can be combined with any of the features of the sleeve support as indicated in the above.

According to another aspect of the invention a sleeve support is provided comprising a rim support for supporting a rim of a container and comprising a platform for supporting a longitudinal edge of a sleeve, wherein a height of the container is smaller than a distance between the platform and the rim support. This will allow underlapping.

According to a further aspect of the invention a labelling method for fixing a sleeve around a container is provided. The method comprises supplying a sleeve of heat shrinkable foil. The method further comprises supplying a container.

According to an embodiment supplying sleeve of heat shrinkable foil comprises providing flattened tubular foil, opening the foil and cutting sleeves from the foil. This automated and continuous method, e.g. known from WO2011-031160 in the name of the same applicant, explicitly included by reference, allows high speed supply of tubular foil and individual sleeves. This will increase the speed at which the labelling method can operate.

According to a further embodiment the method, supplying the sleeve comprises bringing the sleeve into the predetermined position, preferably ejecting the cut sleeve into the predetermined position. Accordingly in a single operational step the sleeve is put in the predetermined position. Providing and supplying the sleeve, by cutting the sleeve from foil, is according to the invention directly followed by bringing the sleeve in the predetermined position in which it will be fixed to the container. This prevents further operational steps for handling the sleeve and/or obtaining the predetermined position after supplying the sleeve. The method accordingly is reduced in complexity. This will save costs, not only operational but also for configuration.

In an embodiment the supplied sleeves and/or supplied containers are conveyed. A method that comprises the continuous conveying of sleeves and/or containers allows operating at higher speeds. Such continuous conveying is an improvement of EP 1 587 736-A1. Conveying can comprise supporting the sleeve/container in an upright position. In an embodiment conveying comprises supporting the container in a hanging arrangement.

In an embodiment the method comprises arranging the sleeve around the container. The container and sleeve arranged around the container are transported into a heat shrink oven and the sleeve is heat shrunk around the container to fix the sleeve to the container. The method allows a continuous operation of feeding sleeves and containers. For heat shrinking preferably steam is used. The container and sleeve are preferably held in an upright position. The longitudinal axis of the sleeve extends in a vertical direction. Steam can be applied onto the sleeve from the sides while transporting the sleeve/container through the heat oven.

According to an embodiment the method comprises holding the sleeve in a predetermined position with respect to the container. This will allow positioning and eventually fixing the sleeve at a desired position around the container. A predetermined position according to this application is a position or orientation of the sleeve with respect to the container wherein at least one, preferably two, and more preferably three degrees of freedom of the sleeve with respect to the container is/are locked. Supporting in accordance to the invention comprises an auxiliary supporting element, auxiliary to the sleeve, container and conveyor. The auxiliary support allows positioning the sleeve in a desired position with respect to the container, e.g. halfway a container.

The inventor found that use can be made of the properties of the fold of the sleeve. The folds formed in the tubular sleeve are the result of flattening the foil allowing more easy transport of the foil e.g. winded on a rack. Although the tubular foil is opened, these folds will remain present after opening and ejection. These folds, extending in a longitudinal direction of the sleeve form a part that is more stiff and can be compared with a rill or crease. The higher stiffness allows complicated handling and guidance thereof. Although in an embodiment the sleeve is opened prior to ejection thereof for supplying the sleeve, the sleeve will have a tendency to close as a result of the remaining form-memory of the sleeve material. In the closed state the foil/sleeve is flat.

In an embodiment holding the sleeve in a predetermined position comprises supporting the sleeve radially inwards. By providing the support from outside inward a container can still be received in the opened sleeve and support of the sleeve can be continued after arranging the container. The sleeve supporting function is continuous until the heat shrinking starts and the sleeve is connected by heat.

In a further embodiment radially inward tension is provided on the folds of the tubular sleeve formed from flattened tubular foil. As the folds of the sleeve provide longitudinal stiffness in the sleeve engaging on the sleeve folds can be transferred onto the sleeve as a whole. As a result of the shape memory, the sleeve wants to regain its flattened position. The pushing on the folds counters this effect and opens the sleeve.

In an embodiment the method comprises holding the sleeve in a predetermined position with respect to the container by supporting a circumferential edge of the sleeve and engaging from opposite sides on an exterior side, preferably of the folds, of the sleeve forcing the (folds/)sleeve towards each other opening the sleeve. The support of the circumferential edge of the sleeve will provide supporting the vertical direction locking the position of the sleeve in a first degree of freedom, while the radially inward directed support will open the sleeve allowing the container to be received in the opened sleeve.

In an embodiment the method comprises providing a dummy support for temporarily supporting the sleeve. Preferably the dummy support supports the sleeve in its predetermined position from inside out. The dummy support can be pushed away by supplying the container. The dummy support can be spring biased, preferably in an upward direction. By lowering a container onto the dummy, the dummy is moved downwardly against the spring and is e.g. retracted in a bottom part of support device.

In an embodiment supporting the sleeve in the predetermined position comprises support extending in a longitudinal direction of the cylindrical sleeve. The longitudinal extended support is preferably combined with guiding the sleeve.

In an embodiment the folds of the sleeve are received in a V-shaped groove extending in a longitudinal direction of the sleeve in order to lock rotational freedom of the sleeve. This will allow positioning the sleeve in a fixed rotational position with respect to the container, e.g. allowing a labelling text to be positioned and fixed onto the container at a predetermined position. Locking the rotational freedom deprives the label from at least one degree of freedom in its predetermined position.

In embodiment the method comprises guiding the sleeve into the predetermined position by leading the folds of the sleeve in a groove extending in a longitudinal direction of the sleeve. Guiding the fold of the sleeve will increase the reliability of the operation. The ejection of the sleeve into the predetermined position will be more controlled. From ejection, the sleeve is brought in the predetermined position in a single operation.

In an embodiment folds of the sleeve are aligned with guides or grooves in the supporting elements for supporting the sleeve in the predetermined position. The guides are aligned with an ejection direction of the sleeve supply.

In an embodiment the method supporting the sleeve in the predetermined position with respect to the container also comprises supporting a rim of the container. This will position the container with respect to the sleeve and result in more reliability.

By supporting the rim of the container the bottom of the container can be positioned above the supported circumferential edge of the sleeve. The container is lifted, while the sleeve extends downwardly beyond the bottom of a container. The method can then comprise underlapping the container. The sleeve is shrunk engaging and fixed under the bottom of the container.

One or more methods for holding or supporting in the predetermined position can be combined in order to achieve sufficient support for the sleeve.

In an embodiment holding the predetermined position is maintained until after transporting the container with sleeve into the heat shrink oven. The predetermined position is maintained until the heat shrinking starts. The assembly of container and supported sleeve in the predetermined position are transported into the heat oven for heat shrinking and fixing the sleeve around the container. In this embodiment, a single operation from ejection of the sleeve until transporting the sleeve into the oven is needed for positioning the sleeve in the predetermined position with respect to the container. The predetermined position is such that it can be obtained after ejection of the sleeve and allows a container to be positioned surrounded by the sleeve. The sleeve support functions continuously until the sleeve is connected by heat to the container. EP 1 016 595 does not show heat shrinking while the sleeve is supported in its predetermined position.

Different orders for supplying the containers and sleeves are possible. However it was discovered the orders have different advantages.

In an embodiment the containers are supplied and positioned first on a conveyor and the sleeve is arranged over the container positioned on the conveyor. A supporting element can partially surround the position of the container on the conveyor. The supporting element can provide guides for positioning the container with respect to the support elements. The conveyor can e.g. have opposite guiding columns on opposite sides of a container position as supporting elements for the label. The support elements for supporting the sleeve in the predetermined position can be fixed to the conveyor.

In another embodiment the sleeve is supplied first to a conveyor upstream from the container supply. The supplied sleeve is held in the predetermined opened position. The supported sleeve is transported and containers are arranged into the opened sleeve. In this embodiment the predetermined position is a position that allows positioning the container such that the sleeve surrounds the container.

A specific advantage of this embodiment is that it can be determined whether the sleeve is correctly positioned. If not, arranging the costly product in the incorrectly supported sleeve is prevented.

In an embodiment the method further comprises deep drawing or thermoforming packaging containers, such as cups or the like, on a packaging material strip in at least one longitudinal row. The containers will have a rim. The rim of the container can be used to support the position of the container.

According to yet another aspect a labelling method for arranging a sleeve around a container comprising the supply of sleeves of heat shrinkable foil, the support of the sleeve in an opened position by supporting interior sides of sleeves, the supply of containers by arranging the containers in the opened sleeves thereby replacing the supports of interior sides of sleeves, the transport of containers with sleeves into a heat shrink oven and the heat shrinking of sleeves around containers in the heat shrink oven to fix sleeves to containers.

In an embodiment replacing the support of the interior side comprises moving the support of the interior side against a bias.

The skilled man will be able to combine any of the above mentioned features with the second method.

It will be clear to the skilled person that the drawing shows only preferred embodiments, and that other embodiments fall within the scope of the invention. Although the drawing will show preferred embodiments, and the invention was described with the appended claims, it will be clear to the skilled person that the invention can encompass other features mentioned explicitly in this description, but also implicit features. It will be clear to the skilled person that any of these explicit or implicit features can be combined with features mentioned in this description or in the claims. Divisional applications directed at these features are possible.

Figure 2A:
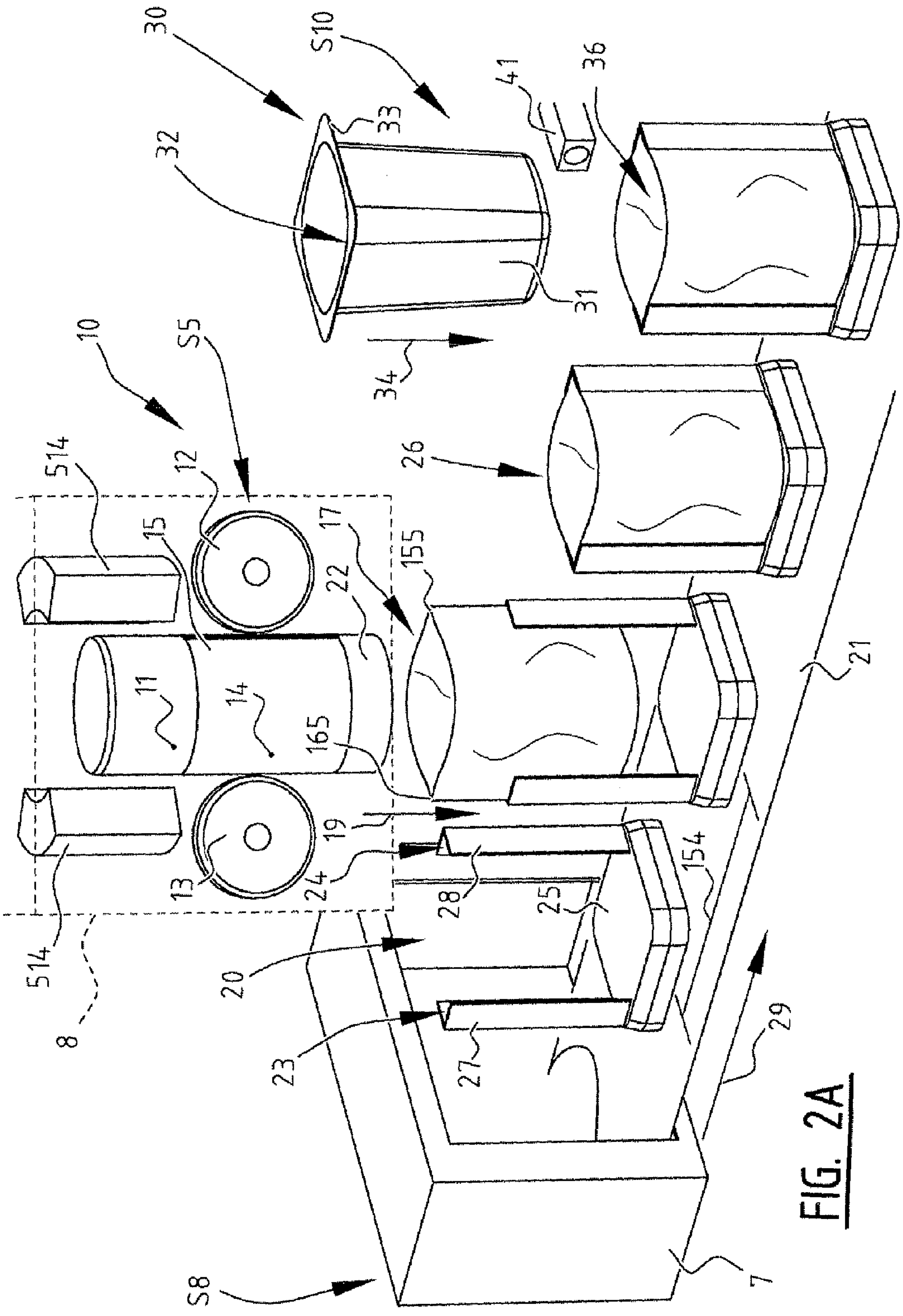
Figure 2B:
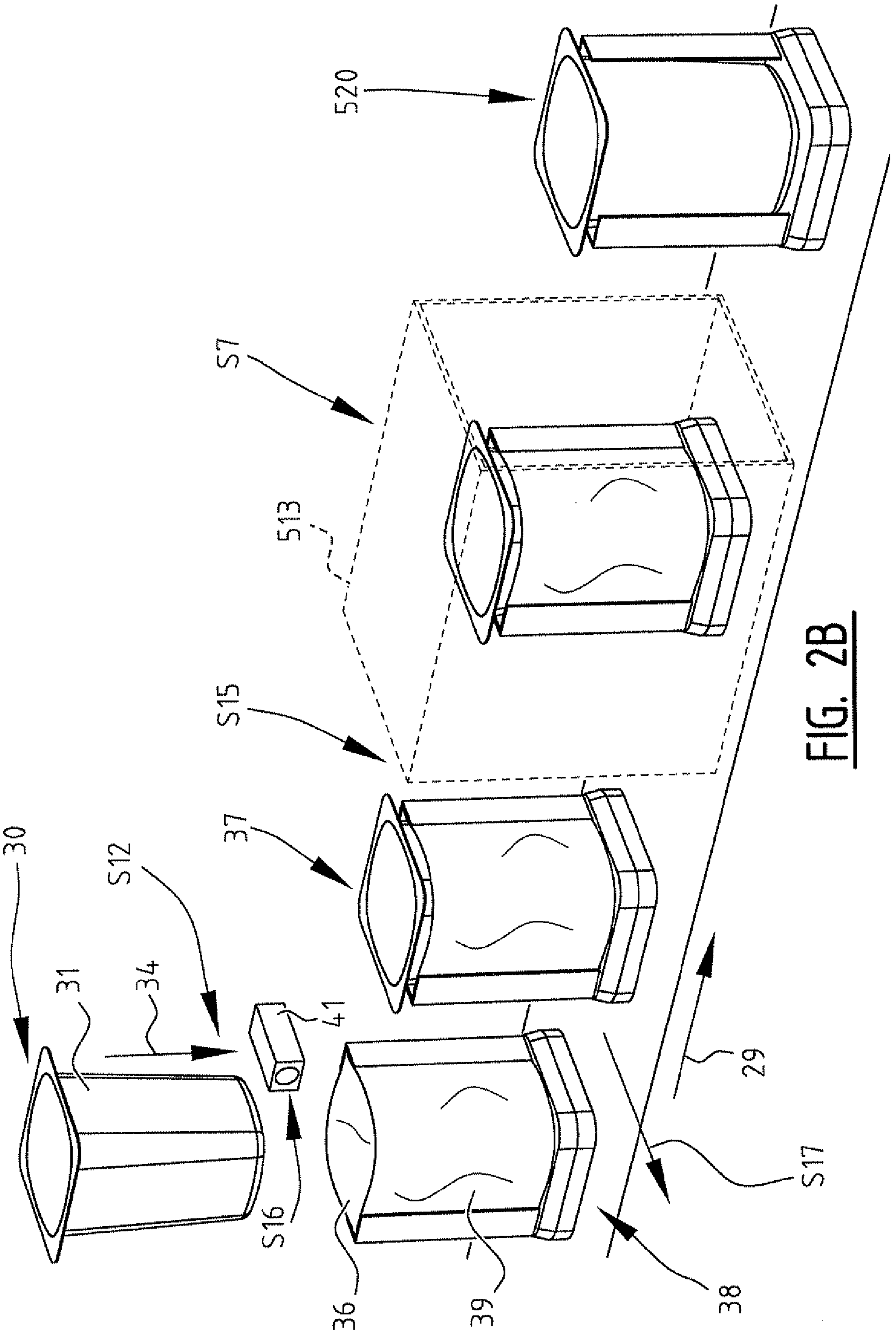
Figure 2C:
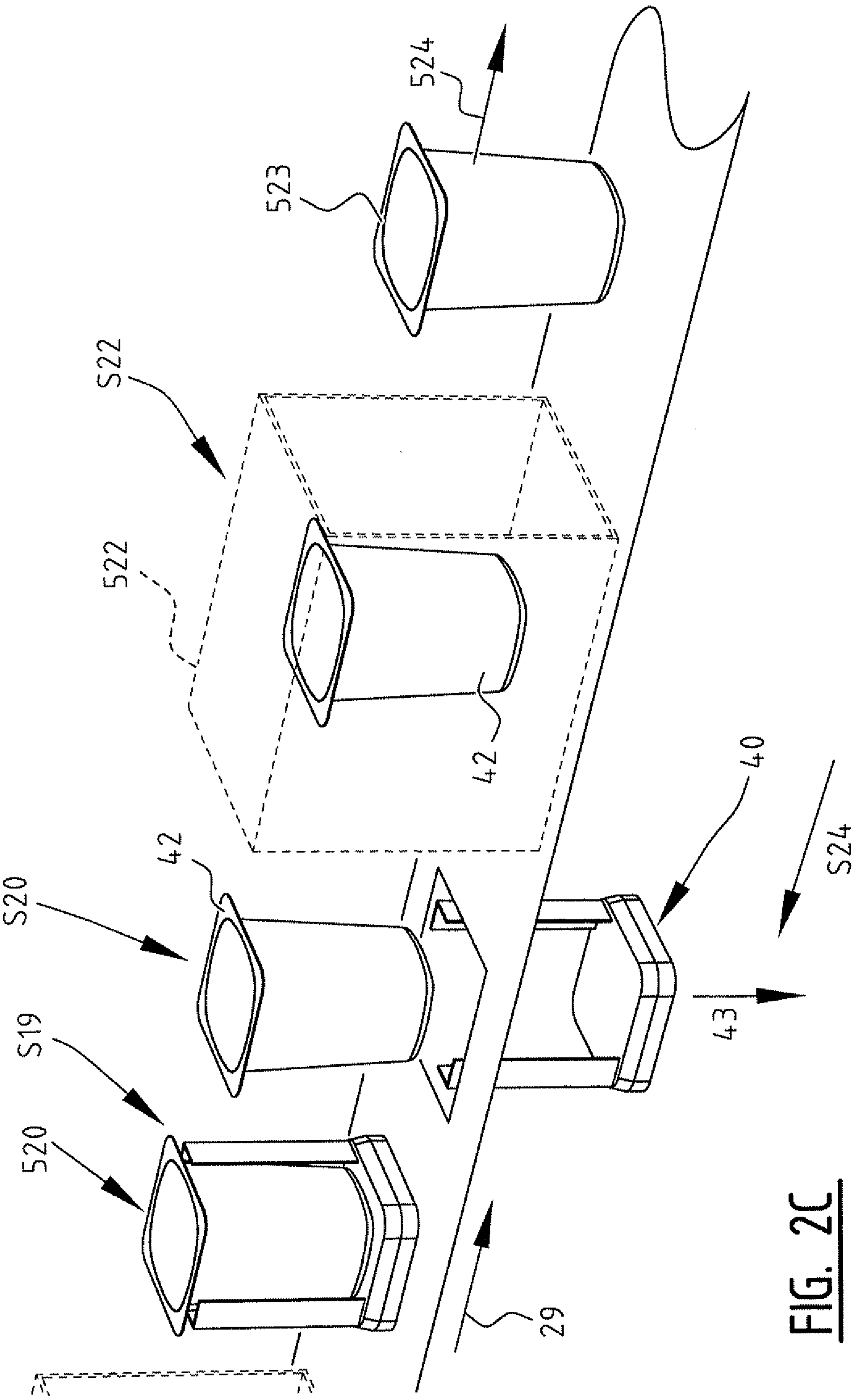
Figure 3:
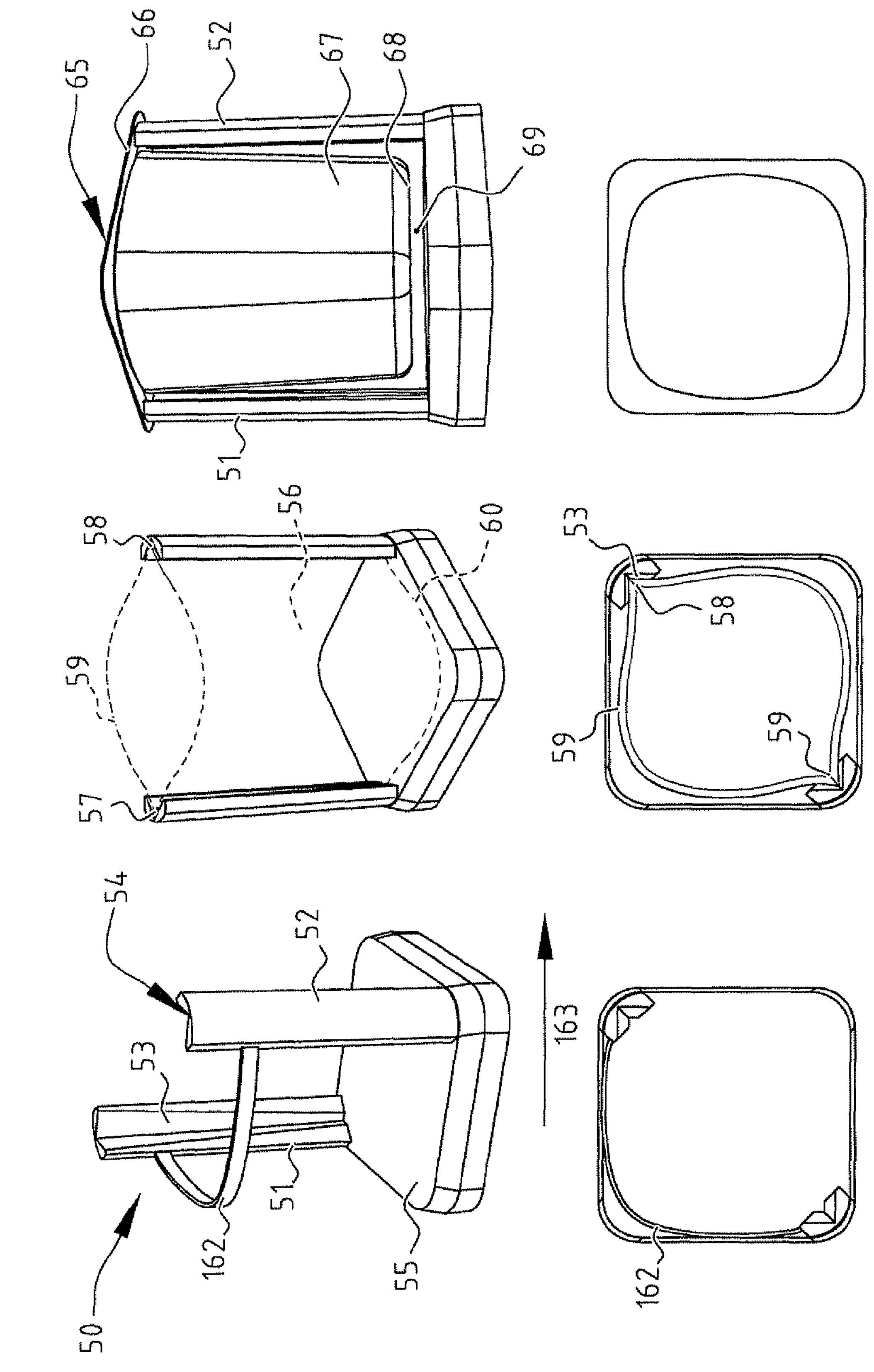
Figure 4A:
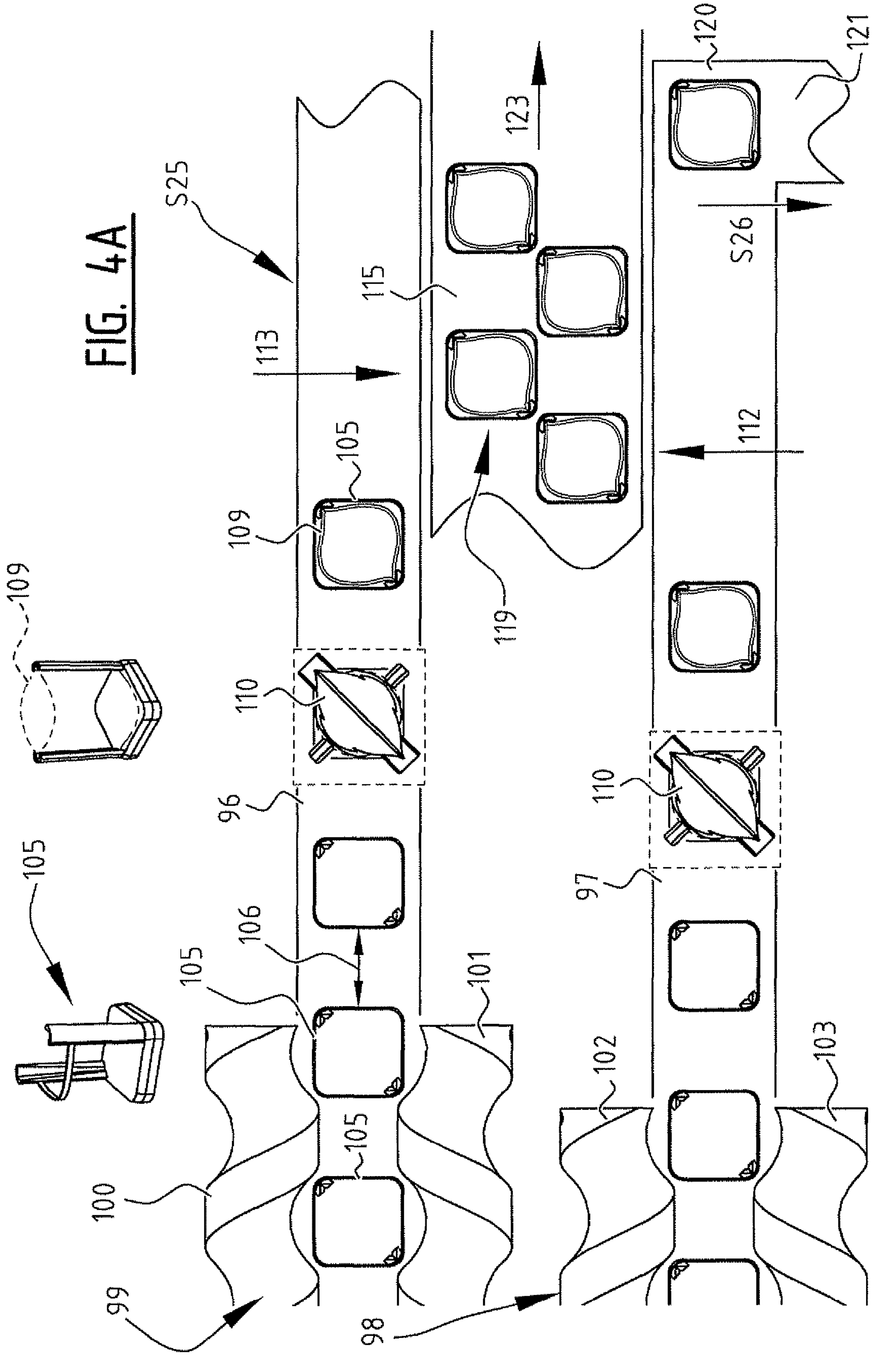
Figure 4B:
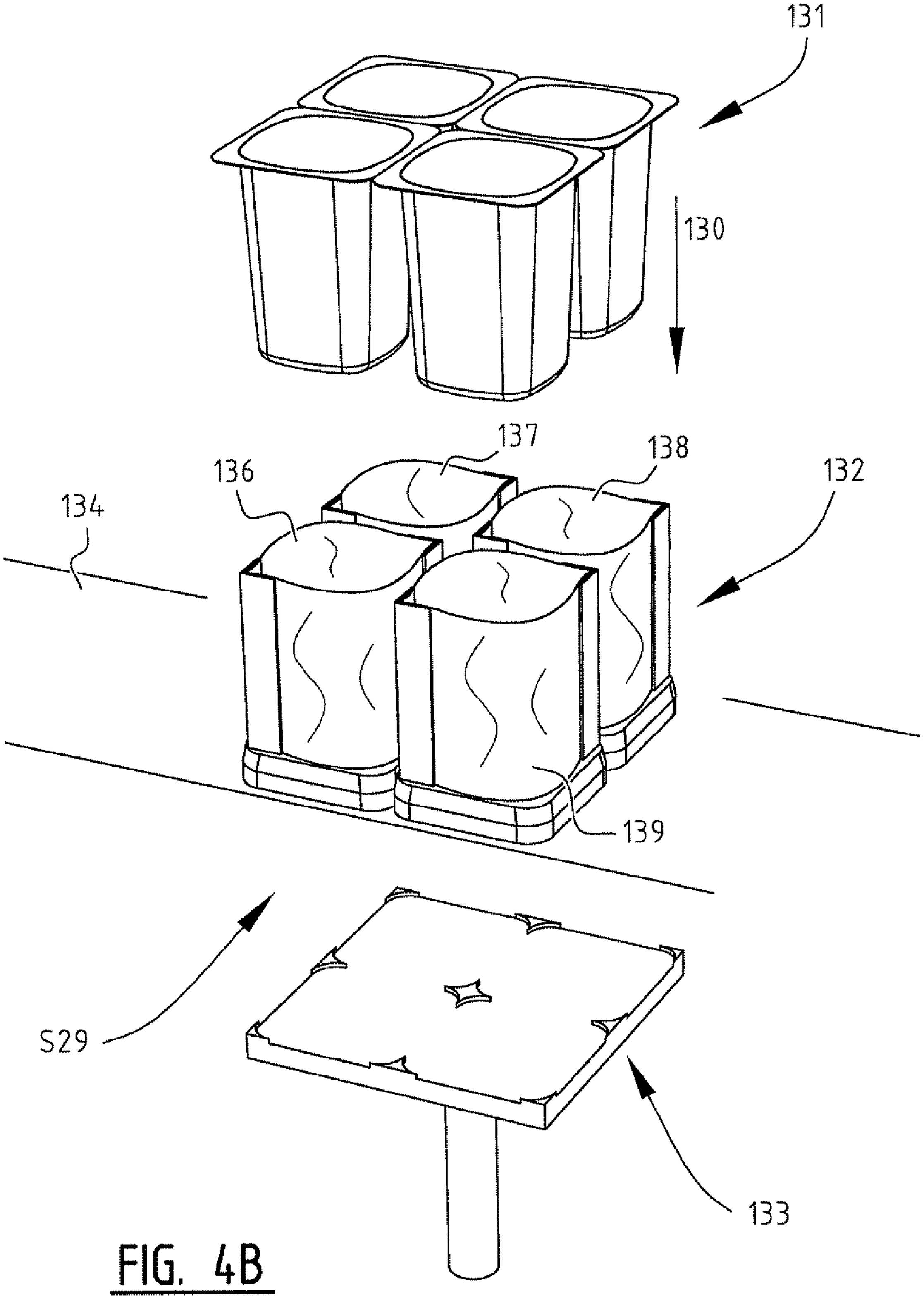
Figure 4C:
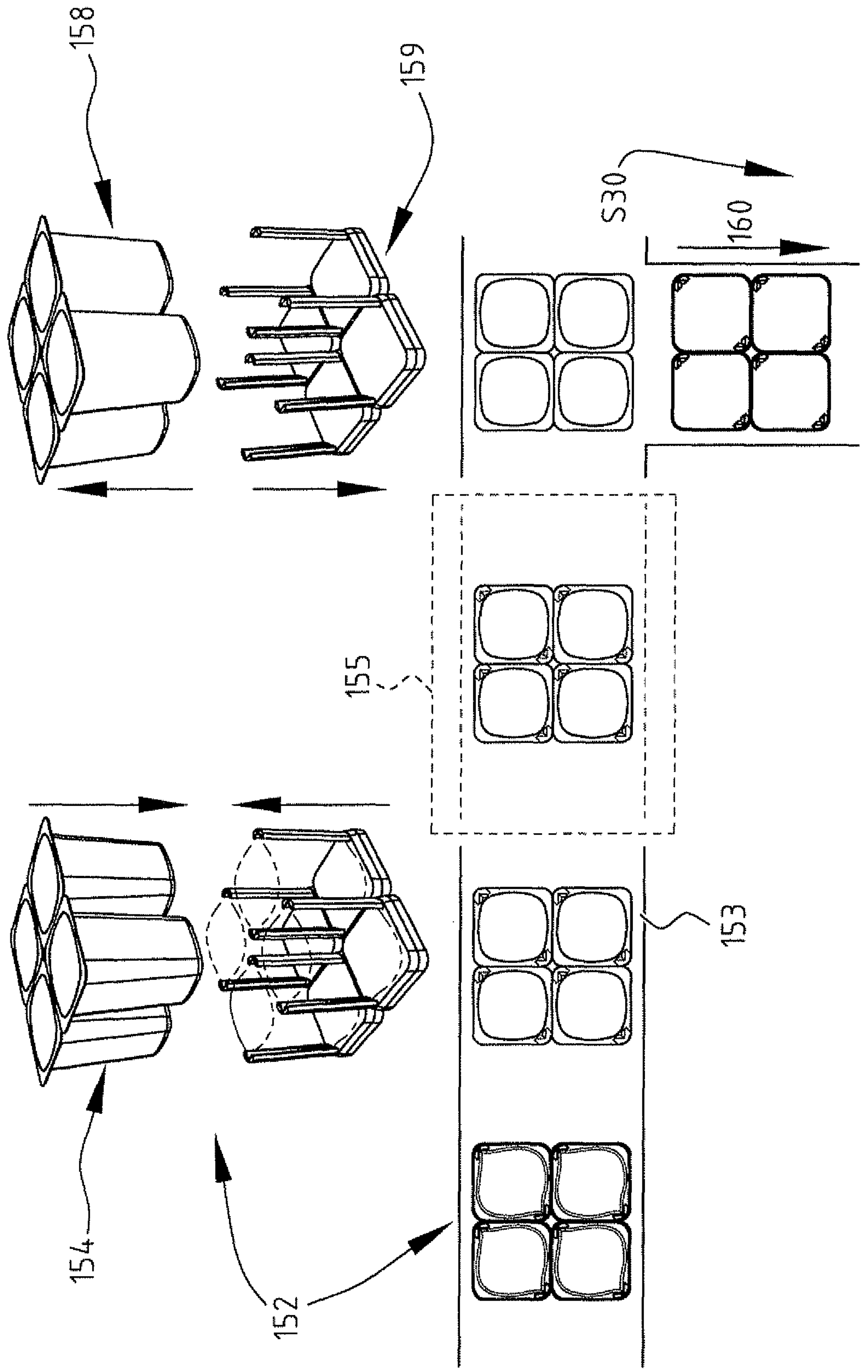
Figure 5B:
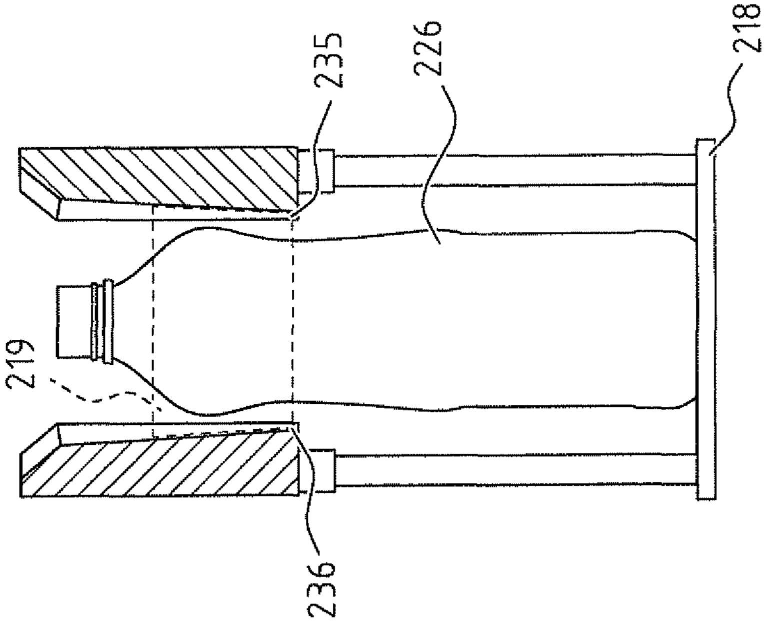
Figure 5A:
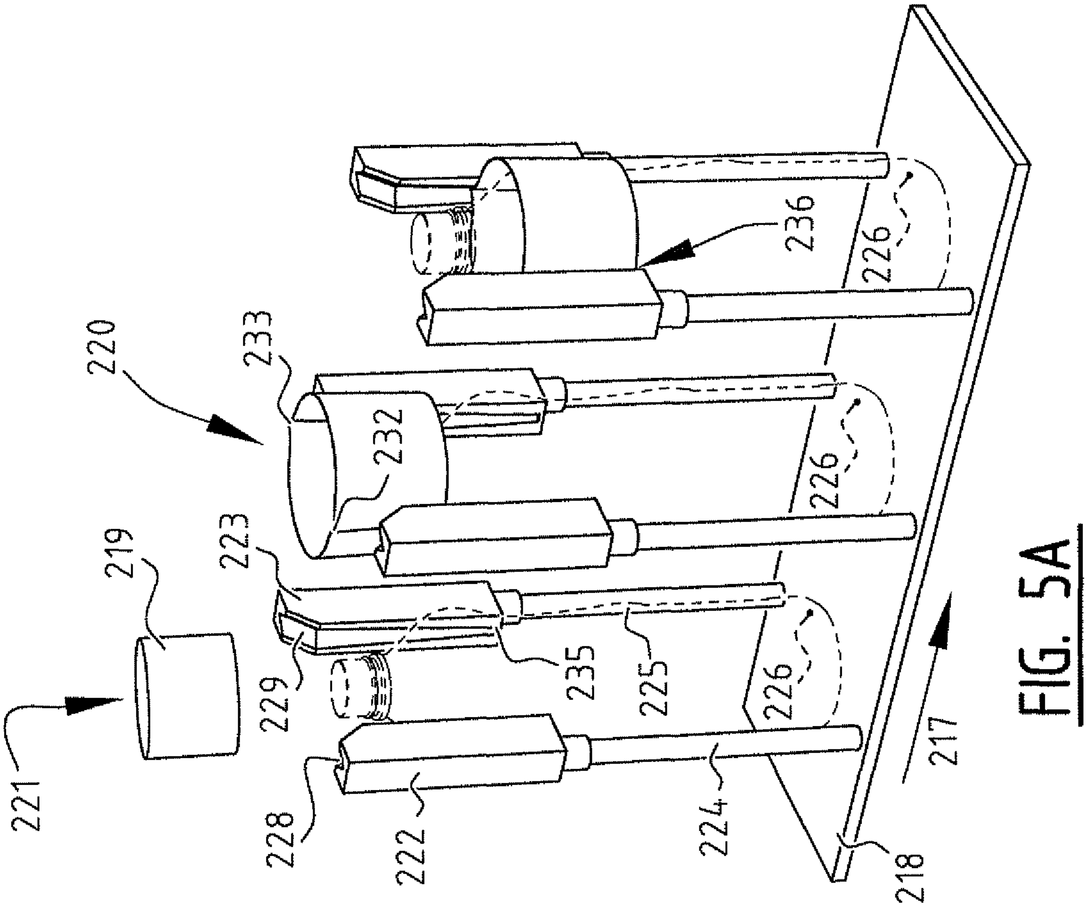
Figure 6:
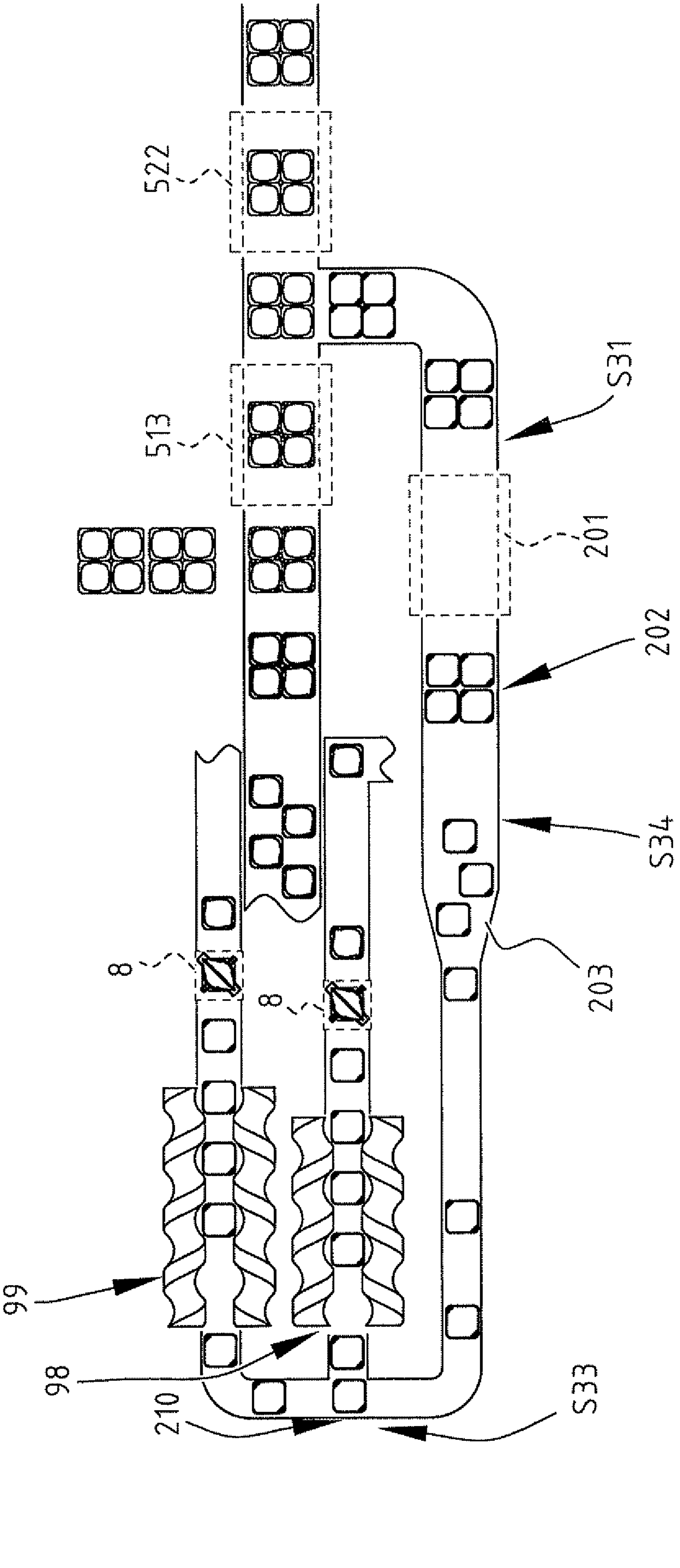
Figure 7:
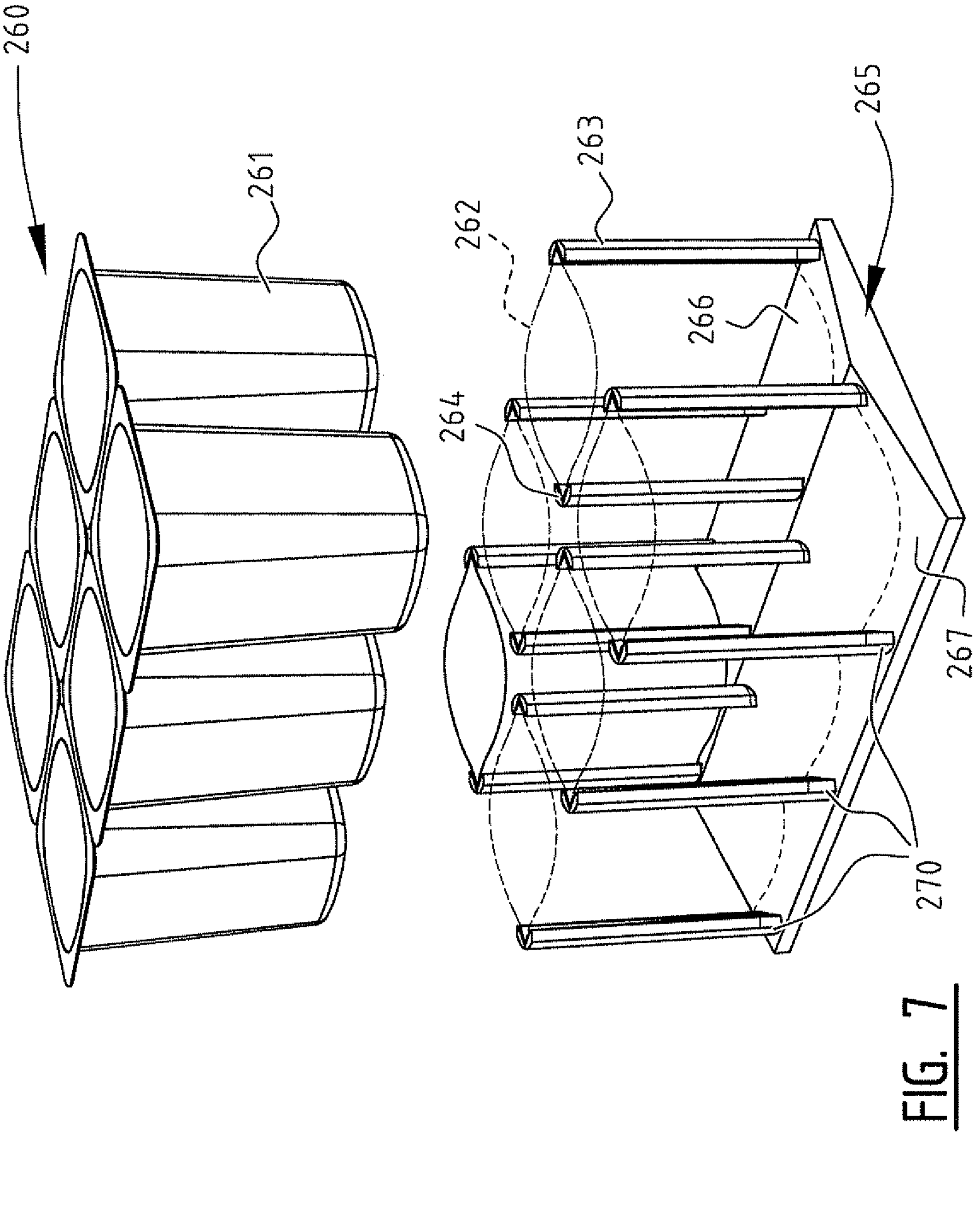
Figures 8A, 8B, 8C:
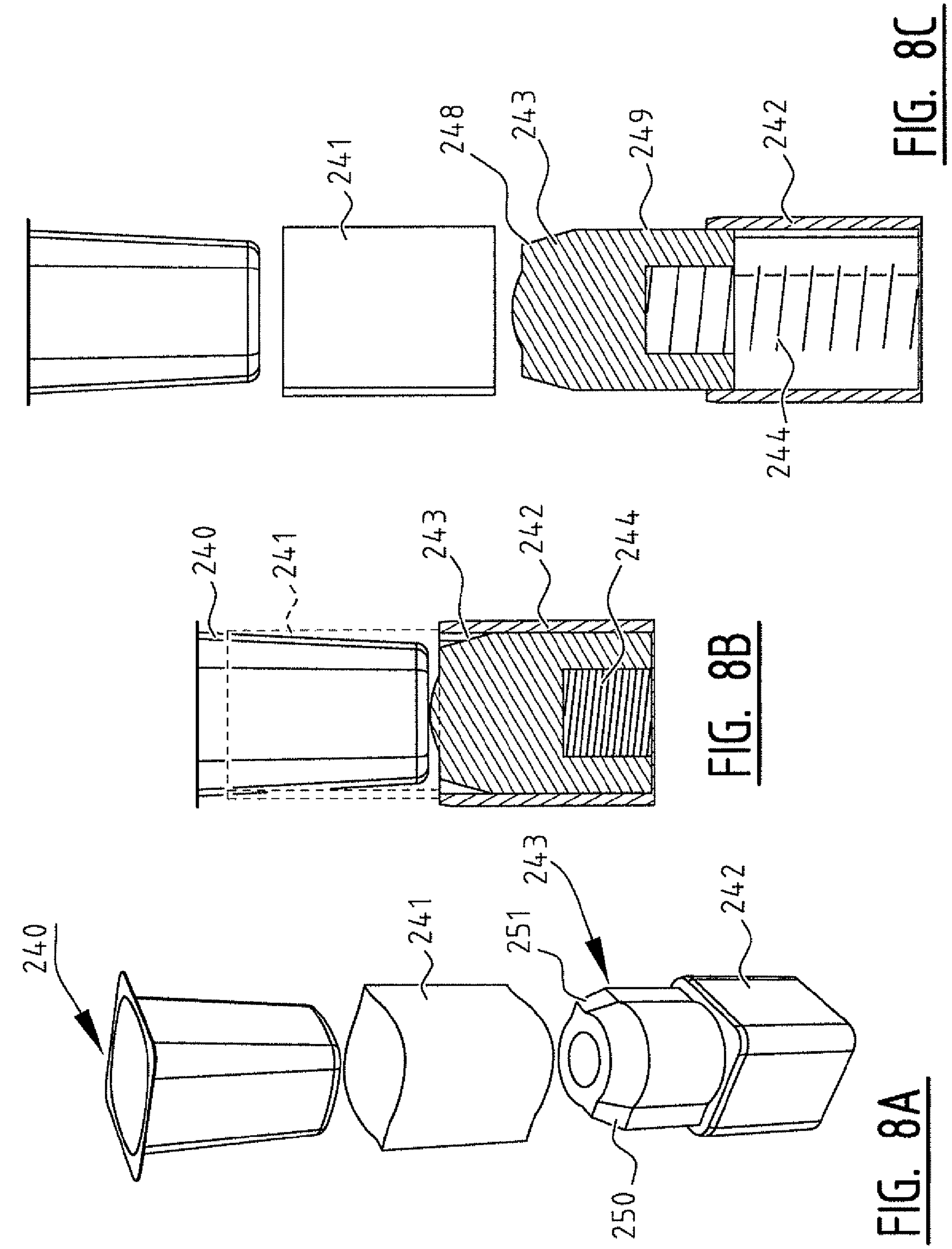

Embodiments will now be described referring to the drawing, wherein:

FIG. 1 shows a schematic overview of an embodiment of a system and method for sleeving a product, FIG. 2A-2C show perspective views of the first embodiment of the invention, FIG. 3 shows three perspective views and three top views of a carrier according to a second embodiment of the invention, FIG. 4A shows a top view of a third embodiment of the invention, FIGS. 4B and 4C show perspective and top views of the third embodiment of the invention, FIG. 5A shows a perspective view of a fourth embodiment of the invention, FIG. 5*b* shows a cross sectional view of the fourth embodiment, FIG. 6 shows schematically a top view of a system according to the invention FIG. 7 shows another embodiment of the invention, and FIGS. 8*a*-8*c* show views of a fifth embodiment of the invention.

FIG. 1 shows schematically a system for labelling containers. A foil roll 500 is provided in a foil stock 501. Foil is supplied in step S1. In an embodiment a splicer is used in step S1 to connect subsequent foils from rolls to provide a continuous feed of foil.

The roll provides a heat shrinkable foil 502 in flattened form. The foil is fed to a buffer 503. Buffer 503 allows buffering S2 of foil e.g. when a roll 500 is replaced, to provide a continuous feed 505 to the downstream applications such as the illustrated sleeving device 506 comprising a mandrel 507 and ejection unit 508.

The flattened foil is opened S3 using the tip 515 of mandrel 507. The sleeving device further comprises a cutting unit 514 for cutting of sleeves S4.

Ejection unit 508 comprises two rotatable wheels for physically engaging the cut sleeve, accelerating the sleeve and ejecting the sleeve S5 from the mandrel over the container 511. A suitable controller is arranged to operate the units and to synchronize the ejecting with the containers. Containers are aligned with the ejection unit 508.

Sleeves 510 are cut and shot over containers 509 supported and conveyed S6 in direction 516 by conveyor 512. Conveyor 512 transports the sleeved containers further downstream e.g. into a steam oven 513. Foil 502 is a heat shrink foil. The steam will heat shrink S7 the sleeve and the sleeve is attached to the container, providing a labelled container 518. In a subsequent step S22 a drying process can be applied.

Advantages of a system set up according to FIG. 1 are high speed, accuracy and reliability. Not only sleeves are provided at high speed using the ejection unit 508, but also the heat shrinking in the oven 513 is executed quickly, limiting the actual heating of the container 511 that could already contain the product such as a dairy product. The illustrated system also allows handling of thin foils of less than 60 μm. It is a goal to improve such a high speed handling, sleeving, labelling device/method.

Although embodiments of the invention are not explicitly shown in FIG. 1, it will be clear to the skilled man that the invention can be combined with (parts) of the system/method of FIG. 1. Still at least some embodiments of the invention could comprise a different system or method.

FIG. 1 shows arranging the sleeves over the containers in a vertical downward direction.

FIG. 2A is a schematic representation of part of a system 10 according to the invention and part of the method according to the invention. FIG. 2A focuses on the ejecting S5 and positioning of the sleeve from the mandrel 11 onto the carrier 20. Although FIG. 2A shows ejecting the cut sleeve 14 from the mandrel 11, the invention is in some embodiments not limited to this feature. Mandrel 11, rollers 12,13 and cutting device 514 are part of schematically illustrated sleeve supply 8.

In the sleeving system 10, flattened tubular foil is fed from a foil supply (not shown in FIG. 2*a*) in a downward direction 19 over mandrel 11 having a more or less circular cross section. In this embodiment the sleeve 14 is cut using the schematically illustrated cutting device 514 while the sleeve is still held open over the mandrel 11.

In an embodiment foil is fed from a flattened foil supply for tubular foil and is opened by passing the foil over the mandrel 11. In other embodiments the sleeve is opened only after cutting.

Even though the foil is opened, the sleeve will still display a longitudinal fold 15 which remains present in the foil 14 as a result of form or shape memory of the foil. Sleeve 17 shows two folds 155, 165.

The cut sleeve 14 is held between rollers 12, 13 positioned in the proximity of the downstream end of mandrel 11. Rollers 12,13 are part of the ejection unit of the sleeve supply 8. Rollers 12,13 are controlled to synchronize ejection of the sleeve 14 with the alignment of a support/carrier 20.

Mandrel 11 is directed towards conveyor 21 shown schematically. The conveyor 21 can support carriers 20 on the conveyor surface. Carriers 20 are supplied S8 from a carrier supply 7, illustrated schematically. The carrier supply 7 is arranged to position the carriers onto the conveyor having a pitch 154. The pitch 154 can be controlled with carrier supply 7. The pitch can dependent on any combination of the speed of supply of sleeves, the size and/or thickness of the sleeves 14 and downstream handling of the carriers 20. As the carriers 20 are not fixed to the conveyor surface, the pitch can be easily varied. This reduces downtime of the system 10, when sleeving parameters are changed.

In the shown embodiment carrier 20 comprises a support surface 25 from which two columns 27, 28 extend upwardly, the columns having a V-shaped groove 23, 24 respectively. The carrier 20 is arranged to hold the sleeve 14, 17 in a supported predetermined position.

The assembly 26 of sleeve and carrier shows the sleeve held in a predetermined position. In this embodiment, as will be shown in FIG. 2*b*, the support of the same supported predetermined position is held until the heat shrinking starts.

'Holding in a supported predetermined position' or 'device to hold in a supported predetermined position' (or herein after referred to as 'predetermined position') is a position or orientation of the sleeve with respect to the container in which the sleeve is to be fixed to the container. Holding the predetermined position can comprises some kind of support for the sleeve to hold a position with respect to the container additional to the support of the sleeve by the conveyor. FIG. 1 is an example of a sleeve not held in a supported predetermined position.

Holding in the predetermined position comprises preferably locking two, three or more degrees of freedom of the sleeve.

Preferably an auxiliary element, such as a sleeve support or carrier, is used. In an embodiment the sleeve is supported by a first element (e.g. a conveyor or plate), while the container is supported by another element (e.g. hanging on transport wires. Examples of predetermined positions are an opened position, a rotationally locked position, an elevated position of sleeve or container and so on. Examples will be provided hereunder. The predetermined position can be a position without the container/product.

Carriers 20 are supplied to the conveyor 21 and travel in direction 29 passing the downstream end 22 of mandrel 11. While passing and in synchronism with the carriers moving past the downstream end of the mandrel 11, sleeve 14 is ejected S5 onto and/or into the carrier 20. As shown, sleeve 17 is still in the process of moving downwards according to arrow 19 into the carrier.

In an embodiment the sleeve supply device 8 supplies, in this embodiment ejects, the sleeve onto the conveyor into the predetermined position, here an opened position allowing to position a product 30 into the opening 36.

As part of the labelling device and method of an embodiment of the invention, an individual sleeve 14, 17 is brought in its predetermined position by ejecting it from the mandrel. Specifically the mandrel and ejecting method allows high speed handling of sleeves which speeds are over 400 sleeves per minute. Further, this also allows handling sleeves of limited thickness, preferably less than 50 micron. Other embodiments comprise different handling of individual sleeves without ejecting it from the mandrel.

In this embodiment the supplying of the sleeve 14, 17, independent of the ejecting of the sleeve, comprises aligning folds 15, 165, 155 with grooves 23, 24 to guide S9 and hold the folds 155, 165 in the grooves 23, 24 respectively. In the embodiment using ejecting from the mandrel 11, the foil 14 transported over the outer mandrel surface having the fold 15 is arranged such that fold 15 is aligned with the columns 27, 28 and is ejected when the alignment occurs when the carrier 20 moves underneath the mandrel downstream end.

The V-shaped groove 23, 24 is an embodiment of a foil fold guide that is arranged to receive, guide S9 and thereafter abut folds 15, 155, 165 of sleeve 14, 17. The columns 27, 28 and grooves 23, 24 as well as support surface 25 are each arranged to limit the degrees of freedom of the sleeve held in the predetermined position. Holding the folds 15,155,165 will lock the rotational degree of freedom. The columns 27,28 are examples of outside inward support for holding the sleeve in the predetermined position abutting on an outside surface of the sleeve. An advantage of this embodiment is the lack of actuating elements for engaging.

As a result of the form and shape memory of the sleeve 17, the sleeve will be biased to return to its flattened form. I.e. folds 155, 165 tend to be forced away from each other. The carrier 20 however forces the folds towards each other. This results in an opened position of the sleeve as indicated for assembly 26. In its predetermined position the sleeve is held in such a way that an opening 36 is present at the top side of the sleeve.

The opened state allows positioning a container 30 into said opening according to arrow 34.

In other embodiments the carrier including the sleeve in a predetermined position is fed upwards onto the container 30.

Further when the folds 155, 165 are received in the grooves 23, 24, the rotation of the sleeve with respect to the carrier 20 is prevented. Folds 155, 165 provide an increased stiffness to the sleeve 17 extending in the longitudinal direction of the sleeve. This increased stiffness is used by receiving the folds in the groove and locks the rotational freedom of the sleeve with respect to the carrier.

FIG. 2*a* shows an example of a container 30 to be used in combination with the invention. The container is supplied S10 from a (not shown) container supply. Although the invention isn't limited to a specific container/product to be sleeved, a preferred embodiment uses container 30 comprising a rim 33 near a top end. The container 30 has container volume 32 for receiving a suitable product such as a dairy product, such as yoghurt or ice-cream, or milk, but also other single portion nutrients such as nuts.

The container product 30 is in a preferred embodiment of the invention a thermo-formed product formed from a plastic sheet, e.g. using deep drawing (not shown S11). Thermoforming can be part of the system 10 according to the invention, in particular part of the container supply.

The product container 30 in a preferred embodiment of the invention can have an outer wall 31 surrounding the container volume 32 that is conically shaped, wherein the cross sectional area of the container is smaller near the bottom end and larger near rim 33.

As the sleeve 39 is held in its predetermined position before the container 30 is moved 34 into the opened sleeve, a suitable detector 41 can determine S16 whether the sleeve 39 is held in the predetermined position, specifically, whether the sleeve 39 is opened 36 and/or the folds of the sleeve are held in the V-groove 23, 24 of the columns 27, 28. Further sensor 41 can determine whether the sleeve 39 is supported on the support surface 25.

If one or more of the above conditions is not fulfilled, the carrier 38 including the sleeve 39 can be discharged (not shown S17). The discharging of the carrier/sleeve assembly from the conveyor before product 30 is entered into the opened 36 sleeve 39 prevents waste of costly product already present in container 30. Although the incorrectly positioned sleeve is discharged, this operation saves the loss of the product container 30 reducing costs. Specifically, as the carrier 38 is supported only on (and not connected to) conveyor 21, the carrier 38 can be easily discharged from said conveyor, e.g. using a pusher (not shown) directed in a direction perpendicular to transport direction 29.

In FIG. 2B further downstream features of the device and methods are shown schematically. The container 30 is moved S12 downwardly 34 into the opened 36 sleeve 39 being held in its predetermined position by carrier 38. The container wall 31 will be at least partially surrounded by the sleeve 39 forming the intermediate sleeved product 37.

The intermediate product 37 is, in an embodiment continuously, moved S15 according to arrow 29 using the conveyor into the heat oven 513 shown schematically. The heat oven 513 is arranged to shrink S7 the sleeve surrounding the product container. A suitable heat medium such as steam can be used. The steam is e.g. directed at the sleeve from opposite sides along the conveyor passing through the heat tunnel 513.

As the columns of carrier 38 surrounds the sleeved surface area of the container with a relatively small area, the heat transfer medium, such as steam, can reach most parts of the sleeve. Transfer of heat is limited only a little bit. The sleeve held in the predetermined position will shrink almost similar to the sleeve according to FIG. 1.

The carrier 38 holding the sleeve 39 in its predetermined position enters the heat oven 513. The sleeve's predetermined position is supported until the heat shrinking actually starts. By providing support until into the heat shrink oven, the position of the sleeve with respect to the container is held stable until the sleeve is fixed. This allows for much more accurate positioning of the sleeve. Even at high speed, such as at least 500 products per minute or more, accurate positioning of the sleeve, specifically in regard of a rotational relation between product and sleeve, is possible.

A conical container surface 31 would, during shrinking, result in a force pushing the sleeve downwardly as a result of the conical shape. The support surface 25 prevents however that the sleeves moves off the container as a result of this downwardly pushing force. This will reduce product loss.

In FIG. 2C further downstream processing is shown. The labelled product 520 is transported 519 further downstream on conveyor 21 in direction 29. In step S20 the carrier 40 is separated from labelled container 42 by discharging the carrier in direction 43. Step S20 is shown only schematically, other kinds of separation are possible.

In an embodiment the labelled container 42 is lifted from the container e.g. by engaging the rim of the container. The labelled product is fed into a dryer 522 in step S22 resulting in the finished product 523 that can be processed further in a further downstream direction 524.

The separated carrier 40 can also be processed further downstream 43 including cleaning and drying (not shown S24). As a result the carrier 40 can be reused again in the labelling method according to the invention to be supplied to conveyor 21 upstream from the sleeve supply 8 using a carrier supply 7.

Although the invention is illustrated in the above in a certain order of steps, clearly the invention allows to leave out processing steps (such as drying S22) or to perform steps in a different order.

In FIG. 3 a further embodiment of the carrier 50 is shown in more detail. Carrier 50 comprises two columns 51, 52 having grooves 53, 54 extending from a support surface 55. The support surface 55 will support an edge 60 of the tubular sleeve after its supply to the carrier 50. The grooves 53, 54 will engage a fold of the sleeve. The columns 51, 52 will support to a longitudinal side of the sleeve.

The carrier can comprise more support elements for holding the sleeve in the predetermined position that will allow positioning the container in the sleeve and said position will allow the sleeve to be shrunk in its desired position with respect to said container.

As an example additional support arm 162 is shown as a strip like connection between the columns 52,53. The support arm 162 will provide support near the top edge 59 of sleeve 56. When the conveyor 21 is moving at high speeds and sleeve 56 is supplied from the sleeve supply device into the carrier 50 the sleeve is to be accelerated in the conveying direction 29 very quickly. Some additional, temporary, support, is offered by arm 162 specifically when the conveying direction corresponds with direction 163.

Groove 53 extends in a vertical direction and tapers towards the lower end close to support surface 55. The groove 53 will allow guiding the fold in the sleeve. Said fold is more rigid than other parts of the sleeve. The tapering groove 53 will allow position the sleeve 56 more accurately. Specifically in the embodiment as shown, the sleeve's predetermined position will be somewhat conically shaped similar to the conical shape of the product container wall 31.

Columns 51, 52 support opposing sides of the sleeve 56 which will allow using the form memory of the tubular sleeve present in the sleeve as a result of its originally flattened form. The columns will push the folds inwardly, which will force the formally flat sides of the foil to move outwardly, creating a foil held in an opened position as shown in FIG. 3. Folds 57, 58 are received in the grooves 53, 54. The circumferential top edge 59 can extend in a surface formed by (or just under) the top ends of columns 51, 52.

In the top views one can clearly see how the circumferential edge 59 is squeezed into an opened position of generally circular form, while folds 57, 58 are received in grooves 53, 54. The bottom circumferential edge 60 is supported by support surface 55.

An embodiment of a product container 65 comprises a rim 66, a conical container surface 67 and an underside or bottom 68. When the container 65 is positioned in the carrier 50, the rim 66 will be supported at the underside by column ends 51, 52. In this embodiment bottom 68 extends a distance from rim 66 which is less than the height of columns 51, 52 extending from the carrier surface 55 resulting in a space 69 between the bottom 68 and the support surface 55. As the sleeve 56 is supported with the circumferential edge 60 by the support surface 55 the sleeve extends beyond the bottom 68. If the assembly in said relationship is transported into the heat oven, the sleeve can underlap the bottom 68 of the container 65 resulting in a more desired sleeving result.

When the predetermined position of the sleeve is an elevated position, the support surface supporting an bottom edge of the sleeve and the bottom of the container are disaligned. The sleeve is supported at a different height than the bottom of the container.

FIG. 4A shows a top view of another embodiment for applying sleeves to a container. This embodiment is suited for sleeving and labelling a product comprising multiple containers, such as product 131 shown in FIG. 4B. The deep drawn container product 131 is just one of the examples that can be sleeved using the method. In other embodiments a 2×1 instead of a 2×2 container product, a 2×3 or 2×4 or other patterns of containers in a single product can be sleeved. Although similar conical shaped container wall is shown, the method is not limited to such embodiment. Different sizes, cross sections, shapes and patterns can be labelled.

In this embodiment a first and second carrier supply 98, 99 will supply a carrier to the respective conveyors 96, 97. The carriers are arranged to hold a sleeve in a predetermined position and the carriers are arranged to enter a heat oven 155. The carrier supplies 98, 99 comprise rotating bars 100-103 having a helical aperture arranged to supply the respective carriers at a suitable pitch. Distance 106 indicates the distance between respective carriers. The distance 106 corresponds to a distance between the helical apertures on bars 100-103. Other carrier supplies and means for arranging a desired pitch between carriers are possible.

As a result of the carriers being separated from the conveyor, the pitch between the carriers can be arranged and adapted to the container product 131 and/or to other sleeving properties such as the sleeve thickness or ejection speed of the ejection mechanism formed at the downstream end of a mandrel.

When the carrier 105 is released from the respective carrier supplies 98, 99 the carriers are supported by the conveyor and transported downstream in direction 123. Accordingly, the carriers will move underneath the two mandrels 110 shown in top view that allow opening a flattened tubular foil to form a sleeve, to cut the sleeve and to eject the sleeve into the carrier. Sleeve 109 is shown ejected into the carrier 105 downstream from mandrel 110.

In the top view of FIG. 4*a*, it is clearly shown that the mandrel is rotated over an angle of 45° such that the folds in the flattened foil fed to the mandrel are also rotated over 45° and will be aligned with the columns of the carrier and will be engaged in the grooves in said columns. After positioning the sleeve in the predetermined position a pusher (not shown) will exert a force 112, 113 in order to move the carrier supporting the sleeve onto a collection conveyor 115. Clearly a single line or a double line could be formed S25 of carriers but also a double line as shown in FIG. 4*a*. By combining S25 the stream of carriers supporting the sleeve 109 in its predetermined position, the processing speed is further increased.

If it is determined using a suitable sensor (not shown) that a sleeve 109 is incorrectly positioned, the pusher 112 is not used and carrier 120 continues on conveyor 97 downstream and can be discharged S26 in direction 121. The carrier supporting the incorrectly positioned sleeve is discharged before the container product 131 is positioned into the opened sleeve. Again, this is the result of using carriers separated from the conveyors that allow the easy discharge according to FIG. 4A. Collected carriers 119 are transported by conveyor 115 further downstream in direction 123.

In another embodiment carriers are collected on the conveyor 96 or 97 while discharged carriers are collected on separate conveyors.

In FIG. 4B it is schematically illustrated to pack the collected carriers and form a super carrier 132 e.g. by using a device for temporary holding a position 133 that allows positioning the respective carriers at suitable positions. The super carrier 132 places the carrier in accordance with the pattern of containers in the product container 131. The product container 131 can be lowered with the respective containers in the opened sleeves 136-139 according to arrow 130. The lowering can be performed while the super carrier 132 is carried by conveyor 134 and processed for further handling downstream.

Device 133 is simply an example of one of many possible auxiliary elements or guides that can be used to assemble the super carrier 132. In another embodiment guides guide the single carriers into a super carrier form. Step S29 of combining the single carriers into a super carrier can be embodied as desired.

In FIG. 4C super carrier 152 comprising 2×2 individual carriers is filled with product 154. Each of the containers of the product is arranged in the opened sleeves of the super carrier 132. The super carrier with product is conveyed downstream on conveyor 153 into heat oven 155 for heat shrinking the sleeves still held in the predetermined position which corresponds with the desired position of the sleeve with respect to the container surface. The heat will shrink the sleeves onto the container surface.

Downstream from heat oven 155 the super carrier 159 is separated from the labelled product 158. The super carrier can discharged 160 and downstream disassembled into individual carriers. The individual carriers can be fed back to the carrier supply 98, 99 to be reused in the method. An additional cleaning or sterilizing step can be part of the process.

FIG. 5*a* shows a further embodiment. A conveyor 218 fixedly supports arms 224,225 extending upwardly. A container 226 (dotted lines) was already supplied to the conveyor upstream. The conveyor 218 transports in direction 217 the containers 226 along sleeve supply supplying sleeves 219 downwardly 221. Sleeve folds 232,233 are aligned with grooves 228,229 formed in columns 222,223 connected to arms 224,225. Grooves 229,228 end in a support surface 235,236 arranged to support a bottom end of sleeve 219.

Three sleeving positions are illustrated in FIG. 5*a*. The second position shows the sleeve being lowered into the grooves 228,229 guided by folds 232,233. In the third position the sleeve 219 is held in the predetermined position, elevated with respect to the bottom of the container 226.

FIG. 5*b* shows a cross sectional view. As shown sleeve 219 can be oriented with respect to an upper part of the container 226 allowing to use a relatively small label around a top part of the bottle. The support 222,223 is conveyed together with the container and sleeve into the heat shrink oven in order to support the predetermined position until the sleeve is fixed around the container.

In an embodiment the sleeve 219 is supplied from a sleeve supply such as a mandrel. Other types of supply are also possible.

FIG. 6 shows schematically a top view of a system comprising the method of FIGS. 4*a*-4*c*. Carriers supplies 98,99 are shown in a left-hand part of the figure. A super carrier is formed and a 2×2 product is arranged into the opened sleeves. The sleeves are fixed to the containers by heat shrinking in heat oven 513.

The separated carriers are cleaned in a cleaning/sterilisation unit 201 in step S31. Sleeved product is dried in dryer 522.

After sterilization super carrier 202 is disassembled in step S34 by a disassemble unit 203. The individual carriers are transported to an upstream end of carrier supplies 98,99. In this embodiment a single carrier supplies is split by a splitter 210 at step S33 to supply carriers to each carrier supply 98,99.

FIG. 7 shows a 3×2 container product 260 of six containers 261. A single carrier 265 comprises six sleeve positions for opened sleeves 262, each held between columns 263,264 extending upwardly from carrier 265. The carrier surface comprises to planes 266,267 positioned at an angle. This will allow condensation or water to be guided away from the carrier 265.

In order to support the sleeves with the longitudinal direction in a generally vertical direction, the ends of grooves formed in column 263 end somewhat elevated with respect to the surface. Stops 270 will allow holding and supporting the sleeve at a height similar to the height of the support surface near the middle edge between surfaces 266,267.

FIG. 8*a* shows a further embodiment comprising a carrier having a sleeve supporting element that supports from inside out. The sleeve support element 243 comprises two vertical guides 250,251 formed generally complementary to guides 228,229. Guides 250,251 will guide the longitudinal folds of sleeve 241 and lock the degrees of freedom.

Sleeve 241 is fed from above over sleeve support 243. The bottom edge of sleeve 241 is supported by an upper end of carrier 242. The sleeve 241 is held in a similarly opened predetermined position.

In order to arrange a container 240 into the opened sleeve 241, sleeve support 243 is spring biased upwardly by a spring 244 shown in the cross sectional view of FIG. 8*b*. Arranging the container into the opened sleeve will move the sleeve support or dummy 243 into the carrier house 242. The weight of the container, specifically the weight of the product contained in the container 204 will force the dummy into its retracted position as indicated in the FIG. 8*b* received and surround by carrier 242.

FIG. 8*c* shows the dummy 243 spring biased outwardly. Dummy 243 comprises a top part 248 formed conically to ease application of the sleeve around dummy 243. A vertical part 249 forms a sleeve guide.

The embodiment according to FIGS. 8*a*-8*c* illustrates an embodiment wherein the sleeve supply is positioned upstream from the container supply. The sleeve supply or container supply can be any of the above mentioned supplies. In embodiment the carrier 242 is moved upward in order to lower container 240 into the opened sleeve.

Within the scope of this invention many embodiments are possible. Elements disclosed with respect to any of the embodiment mentioned above can be combined or replaced elements from other embodiments.

The invention claimed is:

1. A labelling plant for containers comprising:
a sleeve supply for supplying heat shrinkable sleeves,
a container supply,
a device for arranging the sleeve around the container,
a heat shrink oven for fixing the sleeve to the container, and
a conveyor for transporting containers from the container supply and sleeves from the sleeve supply into the heat shrink oven, and
a sleeve support for positioning one or more sleeves in a predetermined position with respect to the container, the sleeve support comprising a platform arranged for supporting a part of a circumferential edge of the sleeve and one or at least two sleeve support elements arranged to abut on an external side of the sleeve and to support the sleeve in an opened state,
wherein the conveyor is arranged to transport the container, the sleeve arranged around the container and the sleeve support holding the sleeve in the predetermined position with respect to the container into the heat shrink oven.

2. Labelling plant according to claim 1, wherein the sleeve support element comprises a column extending upward from the platform.

3. Labelling plant according to claim 1, wherein the sleeve support comprises a groove extending along a part of the longitudinal side of the sleeve arranged to prevent rotational moving of the sleeve.

4. Labelling plant according to claim 3, wherein the groove is a V-shaped groove directed towards an exterior surface of the sleeve in the predetermined position.

5. Labelling plant according to claim 3, wherein the groove is arranged to receive and guide folds of the sleeve and wherein a controller is arranged to supply sleeves from the sleeve supply when folds in the sleeves are aligned with the groove of the sleeve support.

6. Labelling plant according to claim 1, wherein the support element has a height with respect to the platform that corresponds with the longitudinal height of the sleeve.

7. A labelling plant for containers comprising:
a sleeve supply for supplying heat shrinkable sleeves,
a container supply,
a device for arranging the sleeve around the container,
a heat shrink oven for fixing the sleeve to the container, and
a conveyor for transporting containers from the container supply and sleeves from the sleeve supply into the heat shrink oven, and
a sleeve support for positioning one or more sleeves in a predetermined position with resect to the container, the sleeve support comprising a platform arranged for supporting a part of a circumferential edge of the sleeve and one or at least two sleeve support elements arranged to abut on an external side of the sleeve and to support the sleeve in an opened state,
wherein the container has a rim or collar and a top surface of the support element is arranged as support surface for supporting the rim or collar of the container.

8. Labelling plant according to claim 7, wherein the top surface of the support element has a height with respect to the platform that is larger than the length of the container measured downward from the rim or collar.

9. Labelling plant according to claim 1, wherein the container supply is positioned upstream from the sleeve supply, wherein the sleeve supply and device for arranging the sleeve around the container are the same.

10. Labelling plant according to claim 1, wherein the sleeve supply is positioned upstream from the container supply, wherein the container supply is the device for arranging the sleeve around the container and wherein the container supply is arranged to supply the container in the sleeve in the predetermined position.

11. Labelling plant according to claim 1, wherein the sleeve supply is connectable to a supply of flattened tubular heat shrinkable foil, the sleeve supply comprising an opening unit for opening the tubular foil, a cutting unit for cutting sleeves from the opened tubular foil and an ejection unit for ejecting the sleeve from the sleeve supply.

12. Labelling plant according to claim 1, wherein the container supply is arranged for supplying packaging containers such as cups or the like formed by deep drawing or thermoforming in a clocked manner on a packaging material strip having containers in at least one longitudinal row and having a rim.

13. A labelling plant for containers comprising:
a sleeve supply for supplying heat shrinkable sleeves,
a container supply,
a device for arranging the sleeve around the container,
a heat shrink oven for fixing the sleeve to the container, and
a conveyor for transporting containers from the container supply and sleeves from the sleeve supply into the heat shrink oven, and
a sleeve support for positioning one or more sleeves in a predetermined position with respect to the container, the sleeve support comprising
a platform arranged for supporting a part of a circumferential edge of the sleeve and one or at least two sleeve support elements arranged to abut on an external side of the sleeve and to support the sleeve in an opened state, and
multiple pairs of sleeve support elements positioned on opposite sides of a container position, wherein the container positions are arranged according to a predetermined pattern and wherein the sleeve support elements are positioned diagonally with respect to the container positions.

* * * * *